United States Patent
Yu et al.

(10) Patent No.: US 11,739,702 B2
(45) Date of Patent: Aug. 29, 2023

(54) REHEATED RESIDUAL GAS IGNITOR

(71) Applicant: SAUDI ARABIAN OIL COMPANY, Dhahran (SA)

(72) Inventors: Xin Yu, New Hudson, MI (US); Dave Cleary, Novi, MI (US)

(73) Assignee: ARAMCO SERVICES COMPANY, Houston, TX (US)

( * ) Notice: Subject to any disclaimer, the term of this patent is extended or adjusted under 35 U.S.C. 154(b) by 0 days.

(21) Appl. No.: 17/182,691

(22) Filed: Feb. 23, 2021

(65) Prior Publication Data
US 2022/0268221 A1     Aug. 25, 2022

(51) Int. Cl.
*F02D 13/02*     (2006.01)
*F02B 1/12*     (2006.01)
*F02B 47/08*     (2006.01)

(52) U.S. Cl.
CPC ............ *F02D 13/0276* (2013.01); *F02B 1/12* (2013.01); *F02B 47/08* (2013.01); *F02D 13/0273* (2013.01)

(58) Field of Classification Search
CPC ........ F02B 1/12; F02B 47/08; F02D 13/0276; F02D 13/0273
See application file for complete search history.

(56) References Cited

U.S. PATENT DOCUMENTS

| | | | |
|---|---|---|---|
| 4,128,081 A | 12/1978 | Noguchi et al. | |
| 4,532,899 A * | 8/1985 | Lorts | F01L 3/20 123/292 |
| 6,105,550 A | 8/2000 | Nieberding | |
| 6,536,407 B1 | 3/2003 | Denbratt | |
| 7,367,307 B2 * | 5/2008 | Lampard | F02M 67/08 123/288 |

(Continued)

FOREIGN PATENT DOCUMENTS

| | | |
|---|---|---|
| DE | 553858 C | 7/1932 |
| DE | 3903474 A1 | 9/1989 |
| WO | 9011435 A1 | 10/1990 |

OTHER PUBLICATIONS

International Search Report Issued in Corresponding Application No. PCT/US2022/017488, dated May 31, 2022, 4 pages.

(Continued)

*Primary Examiner* — John Kwon
*Assistant Examiner* — Johnny H Hoang
(74) *Attorney, Agent, or Firm* — Osha Bergman Watanabe & Burton LLP

(57) ABSTRACT

A residual gas ignitor for use in igniting a fuel-air mixture within a main combustion chamber of an engine. The residual gas ignitor includes at least one inlet/outlet port, a residual gas ignitor chamber for receiving a combustion gas from the main combustion chamber, an ignitor valve for opening and closing the at least one inlet/outlet port, an actuator for actuating the ignitor valve to open and close the at least one inlet/outlet port, a valve guide for keeping the ignitor valve in a correct orientation within the residual gas ignitor, a preload spring for being in compression when the actuator disposes the ignitor valve into the closed position, and a heating element for maintaining or increasing a temperature of the combustion gas while the combustion gas is in the residual gas ignitor chamber. The residual gas ignitor may be used in engines for initiating combustion of fuel-air mixtures.

13 Claims, 3 Drawing Sheets

(56) References Cited

U.S. PATENT DOCUMENTS

| | | | | |
|---|---|---|---|---|
| 7,438,043 | B2* | 10/2008 | Shiraishi | F02B 19/12 123/260 |
| 9,856,848 | B2* | 1/2018 | Chiera | F02B 19/1095 |
| 2002/0129798 | A1 | 9/2002 | Urushihara et al. | |
| 2004/0100179 | A1* | 5/2004 | Boley | H01T 13/54 313/143 |
| 2005/0211217 | A1* | 9/2005 | Boley | F02B 19/12 123/266 |
| 2006/0005818 | A1 | 1/2006 | Kuo et al. | |
| 2007/0169737 | A1* | 7/2007 | Gong | F02P 15/08 123/169 MG |
| 2007/0236122 | A1* | 10/2007 | Borror | H01T 13/54 313/118 |
| 2009/0018749 | A1 | 1/2009 | Sauer et al. | |
| 2010/0116242 | A1 | 5/2010 | Guibert | |
| 2012/0125287 | A1* | 5/2012 | Chiera | H01T 13/32 123/254 |
| 2012/0310510 | A1* | 12/2012 | Imamura | F02M 21/0284 701/104 |
| 2013/0047954 | A1* | 2/2013 | McAlister | F02M 57/06 123/297 |
| 2013/0055986 | A1* | 3/2013 | Tozzi | F02P 13/00 123/254 |
| 2013/0139784 | A1* | 6/2013 | Pierz | F02B 19/12 123/254 |
| 2014/0360468 | A1 | 12/2014 | Fedin | |
| 2015/0020769 | A1* | 1/2015 | Huang | F02D 19/0647 123/305 |
| 2015/0040845 | A1* | 2/2015 | Chiera | F02B 19/18 123/41.32 |
| 2015/0075506 | A1* | 3/2015 | Ishida | F02B 25/06 123/65 R |
| 2015/0184578 | A1* | 7/2015 | Oda | F02B 19/18 123/260 |
| 2015/0226143 | A1 | 8/2015 | Iwai et al. | |
| 2015/0354481 | A1* | 12/2015 | Geckler | F02D 41/0057 60/278 |
| 2016/0010538 | A1* | 1/2016 | Suzuki | F02D 19/024 123/292 |
| 2016/0047323 | A1* | 2/2016 | Suzuki | F02D 19/02 60/285 |
| 2016/0084171 | A1* | 3/2016 | Omura | F02D 9/04 123/323 |
| 2021/0222609 | A1* | 7/2021 | Chang | F02D 41/0027 |

OTHER PUBLICATIONS

Written Opinion Issued in Corresponding Application No. PCT/US2022/017488, dated May 31, 2022, 7 pages.

* cited by examiner

REHEATED RESIDUAL GAS IGNITOR

FIELD OF THE DISCLOSURE

The disclosure relates generally to internal combustion engines (ICE) and more particularly to a method and system of improving the operating range of an ICE.

BACKGROUND

Automakers, consumers, and regulators face a challenge of reducing transport related emissions (of CO2 and criteria pollutants) and improving efficiency without significant increases in the cost of transporting people and goods. Innovation in engine and vehicle technology can help to address this challenge.

High cyclic variation and partial miss firing are typical problems for a spark ignition engine operating with high degree of charge dilution at part load condition due to insufficient ignition kernel development during flame initiation and slow flame propagation during later combustion which prevents the further efficiency improvement with diluted combustion.

One opportunity for improving engine efficiency and reducing transport related emissions, such as $CO_2$ emissions and other pollutants, without significantly increasing transportation costs is a concept known as turbulent jet ignition (TJI). TJI uses a pre chamber to prepare a favorable air-fuel mixture for spark ignited combustion. As a result of the combustion, high energy flame jets are ejected from the prechamber into a main combustion chamber, where they ignite compressed fuel-air mixture in the main combustion chamber. The high energy flame jets provide distributed ignition sites that enable fast combustion and high burn rates of the fuel-air mixture in the main combustion chamber. TJI enables efficient combustion of very lean or dilute mixtures.

However, the need for additional fueling and air injection device with TJI increase the complexity and cost of the engine. The ideal (less diluted) mixture condition for spark ignition used in the pre-chamber leads to higher flame temperature, NOx emissions, and particulate emissions in the case of liquid fuel injection. Thus, an ignition device without spark ignition combustion, while still capable of igniting highly diluted combustion, can be favorable.

SUMMARY OF THE CLAIMED EMBODIMENTS

In one aspect, embodiments disclosed herein relate to a system including an engine. The engine includes a main combustion chamber and a residual gas ignitor, the residual gas ignitor being disposed at least partially within the main combustion chamber and in fluid communication with the main combustion chamber through at least one inlet/outlet port.

In another aspect, embodiments disclosed herein relate to a method for operating an engine. The method includes generating a combustion gas in a main combustion chamber, flowing a first portion of the combustion gas into a residual gas ignitor, actuating an actuator in the residual gas ignitor, thereby closing an ignitor valve in the residual gas ignitor, flowing a second portion of the combustion gas into an exhaust gas flow line, as an exhaust gas. The method may further include closing an exhaust valve in the exhaust gas flow line, opening an intake valve in an intake flow line, thereby filling the main combustion chamber with a fuel-air mixture, closing the intake valve, compressing the fuel-air mixture main combustion chamber, and igniting the fuel-air mixture in the main combustion chamber and initiating a second ignition stroke. The igniting and initiating may include de-actuating the actuator in the residual gas ignitor, thereby opening the ignitor valve allowing the first portion of the combustion gas to enter the main combustion chamber, the first portion of the combustion gas igniting the fuel-air mixture in the main combustion chamber and initiating the second ignition stroke.

In another aspect, embodiments disclosed herein relate to a system including an engine. The engine includes a plurality of cylinders. Each of the plurality of cylinders includes a main combustion chamber and a residual gas ignitor. The residual gas ignitors are disposed at least partially within the main combustion chamber of each of the plurality of cylinders and are in fluid communication with the main combustion chamber of each of the plurality of cylinders through at least one inlet/outlet port, and in fluid communication with a common residual gas manifold through a gas valve.

In another aspect, embodiments disclosed herein relate to a residual gas ignitor for use in igniting a fuel-air mixture within a main combustion chamber of an engine. The residual gas ignitor includes at least one inlet/outlet port, a residual gas ignitor chamber, and ignitor valve, an actuator, and a valve guide. The residual gas ignitor chamber may be configured for receiving a combustion gas from the main combustion chamber via the at least one inlet/outlet port. The ignitor valve is configured for opening and closing the at least one inlet/outlet port, and the ignitor valve may be located at least partially within the residual gas ignitor chamber. The actuator may be configured for actuating the ignitor valve to open and close the at least one inlet/outlet port, and the valve guide may be configured for keeping the ignitor valve in a correct orientation within the residual gas ignitor. A preload spring may be configured for being in compression when the actuator disposes the ignitor valve into the closed position, and when the actuator is not actuating the ignitor valve, the preload spring releases compression and opens the ignitor valve allowing for intake of the combustion gas into the residual gas ignitor chamber. A heating element is configured for maintaining or increasing a temperature of the combustion gas while the combustion gas is in the residual gas ignitor chamber.

Other aspects and advantages will be apparent from the following description and the appended claims.

DETAILED DESCRIPTION

Figure 1C:
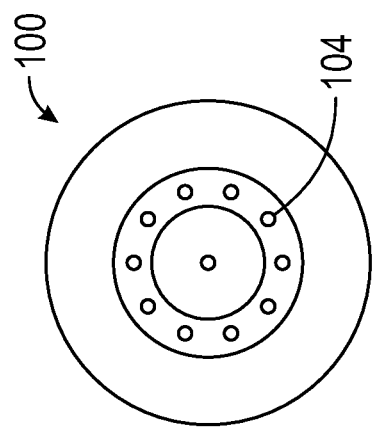
FIGS. 1A-1C illustrate a residual gas ignitor according to one or more embodiments disclosed herein.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with internal combustion engine systems have not been shown or described in detail to avoid unnecessarily obscuring descriptions of the implementations and embodiments. For the sake of continuity, and in the interest of conciseness, same or similar reference characters may be used for same or similar objects in multiple figures.

In order to avoid the side effects of using a spark ignited pre-chamber for enabling reliable ignition of highly diluted fuel-air mixture, a residual gas ignitor that can be installed on the internal combustion engine is disclosed herein. This residual gas ignitor may assist the initiation of combustion during diluted operation by reheating the residual gas from a previous engine cycle and using the reheated residual gas for igniting a premixed fuel-air mixture in the combustion chamber during the next engine cycle.

The residual gas ignitor is a device that emits high temperature residual gas into the combustion chamber to ignite the premixed fuel-air mixture for repeatable combustion. The hot residual gas is collected from a previous combustion cycle and stored in a small separate chamber, which is separate from the main combustion chamber of the cylinder. In some embodiments, the residual gas ignitor may be external to the engine cylinder. The chamber in the residual gas ignitor may maintain the temperature and pressure of the residual gas until the release of hot residual gas is needed. In one or more embodiments, the pressure in the residual gas ignitor may be from 5 bar to 250 bar, such as from 10 bar to 150 bar, or such as 20 bar to 100 bar, and may have a temperature from 400° C. to 2000° C., such as from 600° C. to 1000° C. In one or more embodiments, the residual gas ignitor may have a gas chamber volume of between 0.5% to 10% or 0.5% to 5% of the engine displacement, such as from 5 cm$^3$ to 600 cm$^3$. Due to the temperature and pressure of the residual gas being above the ignition condition of the fuel-air mixture, the mixture auto-ignites and combusts in the engine combustion chamber. This may improve cycle-to-cycle efficiency, reduce the amount of unburnt fuel in the exhaust, and prevent engine knocking.

U.S. Pat. No. 9,856,848 discloses a system having several small cavities, a heating element and valve. A fuel-air mixture is collected in the small cavity, flown over a heating element to ignite the mixture, and flow out of the small cavity. Accordingly, this patent can be thought of as disclosing a process for pre-igniting the fuel-air mixture, and using the flame-front of the pre-ignited mixture to ignite the fuel-air mixture in the main cylinder chamber.

Additionally, U.S. Patent Application No. 2002/0129798 disclose collecting a residual gas in a side chamber. The residual gas is injected back into the cylinder during the compression stroke to heat the fuel-air mixture. U.S. Patent Application No. 2006/005818 and DE3903474 disclose similar processes. However, these systems are used for recycling exhaust gas during an early portion of the compression stroke and are designed for heating the fuel-air mixture in the main chamber during compression.

In contrast, the residual gas ignitor according to one or more embodiments disclosed herein emits high temperature residual gas into the combustion chamber to ignite the fuel-air mixture directly in the main combustion chamber during a late portion of the compression cycle, resulting in a successful and repeatable combustion process. The hot residual gas generated in one combustion cycle is collected during an expansion stroke or an exhaust stroke and subsequently stored in a small, separate chamber. The chamber may maintain the temperature and pressure of the residual gas until the intended release of hot residual gas is needed, such as during a subsequent compression cycle. Due to the temperature and pressure of the residual gas being above the chemical kinetic requirement of the fuel-air mixture under compression during the later portion of the compression stroke, the mixture auto-ignites and combusts in the engine combustion chamber. As used herein, a late or later portion of the compression stroke refers to the piston being at greater than 75%, greater than 80%, greater than 85%, greater than 90%, greater than 95%, or greater than 98% of stroke, such as from 45 crank angle degree to 5 crank angle degree, or from 15 crank angle degree to 5 crank angle degree from top dead center. In other words, the fuel-air mixture is fully compressed or almost fully compressed before the residual gas is injected to initiate ignition of the fuel-air mixture.

This reheated residual gas ignitor may include a small metal cavity with orifice(s), a needle valve, or ignitor valve, a heating element and a solenoid coil. At the end of the combustion process, the needle valve opens to allow high temperature and pressure residual gas to enter the small metal cavity during the expansion cycle. After the pressure of the cavity equalizes with the pressure in the main combustion chamber, the needle valve closes the orifices connecting the small cavity and the main combustion chamber. A heating element in the small cavity is powered on to counter any heat loss through the insulated metal surface of the small cavity and to maintain the residual gas at a desired temperature. As the engine cycle proceeds and combustion initiation is required, the needle valve is opened again and due to the pressure difference between the small cavity and the main combustion chamber the high temperature residual gas will flow out of orifices and enter the main combustion chamber. The premixed fuel-air mixture will be heated upon contact with the hot residual gas to a temperature where the auto-ignition will occur. Then combustion consumes all the chemical energy and finishes the current combustion cycle. After that, the next iteration of combustion cycle repeats. In this manner, the ignitor valve opens and closes twice per complete engine cycle.

Alternatively, in some embodiments, the ignitor valve may be configured to open during compression and release residual combustion gas into the main combustion chamber, thereby initiating an ignition stroke. The ignitor valve may remain open during the ignition stroke and exhaust stroke. This will permit hot, residual combustion gas to enter the residual gas ignitor. The ignitor valve may close before the next subsequent intake stroke, and will remain closed until the following compression stroke. In this manner, the ignitor valve opens and closes once per complete engine cycle. However, due to temperature and pressure cycles, this embodiment may not be preferred over the embodiment where the ignitor valve opens and closes twice per complete engine cycle.

The needle valve, or ignitor valve, during the last cycle combustion event is opened to collect residual gas. Heating elements in the residual gas ignitor main chamber maintain the heat in the combustion gas through insulation and the heat element until the valve opens during the compression stroke, allowing the flow of hot residual gas back into the main combustion chamber. Using such a residual gas ignitor, there is no combustion occurring in the residual gas ignitor gas chamber because there is no, or very little, fuel present in the gas entering the residual gas ignitor from the main cylinder chamber. The benefit of the lack of combustion in the residual gas ignitor reduces the loss of chemical energy through heat loss to the residual gas ignitor wall, and the requirement of the hardware strength may also be reduced as there is no internal combustion with the ignitor. Further, no additional $NO_x$ and particulate emissions may be generated in the ignitor. In addition, the residual gas ignitor may not require complicated sealing mechanisms around the needle valve, or ignitor valve, to prevent combustion gases from escaping during intake and combustion cycles.

The heating element may be controlled by a control system configured for keeping the heating element at a desired temperature, or adjusting the temperature depending on engine conditions. The residual gas ignitor may be equipped with a temperature sensor that tells the computer the temperature of the combustion gas. Based on the indicated temperature, and engine conditions, the heating element may be activated or adjusted.

Figure 1B:
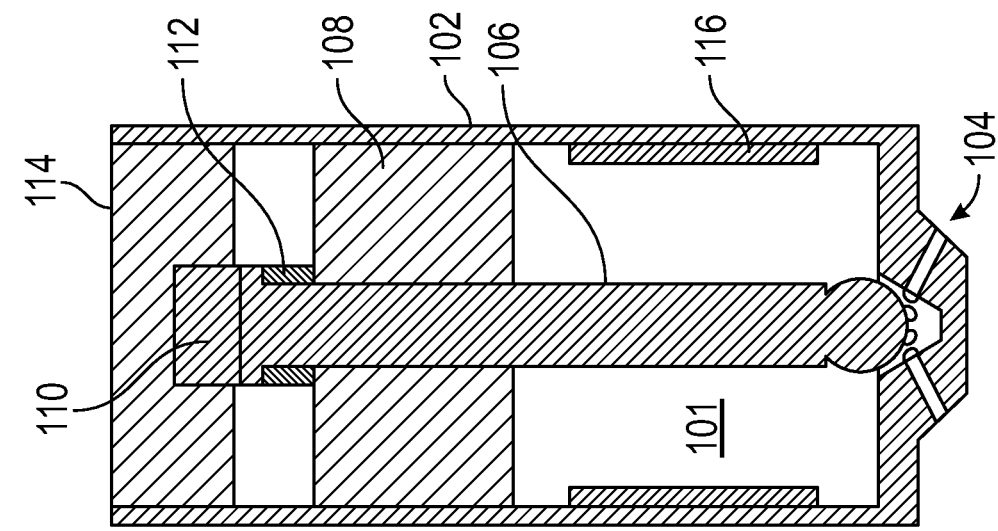
Figure 1A:
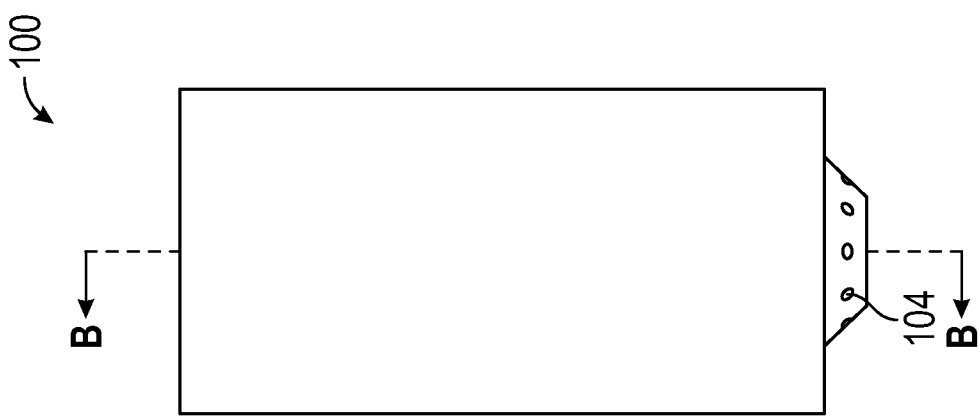

Turning now to the figures, FIG. 1a shows a residual gas ignitor 100 according to one or more embodiments herein. FIG. 1b illustrates a cross-section view along line B-B of a residual gas ignitor 100 according to one or more embodiments herein. FIG. 1c illustrates a bottom view of a residual gas ignitor 100 according to one or more embodiments herein. The residual gas ignitor 100 has a housing 102 capable of being fitted onto an engine block and disposed at least partially inside a cylinder. Residual gas ignitor 100 may have one or more inlet/outlet ports 104 located on a bottom end of the residual gas ignitor. As illustrated in FIGS. 1a and 1c, the residual gas ignitor 100 may include multiple ports 104 disposed circumferentially around the inlet/outlet end of the ignitor. The inlet/outlet ports 104 may be in fluid communication with the gases located within an engine cylinder. In one or more embodiments, the residual gas ignitor 100 may be equipped with two inlet/outlet ports, and in other embodiments may be equipped with as many as ten or more inlet/outlet ports located around the periphery of the bottom of the residual gas ignitor, where the number, spacing, and diameter of the ports may be based on the relative size of the ignitor, wall thickness, and pressure drop requirements to permit ingress of residual gas into the ignitor and egress of hot residual gas for ignition during the next cycle. An ignitor valve 106 may be disposed within the residual gas ignitor 100 and may be operable for opening and closing the inlet/outlet ports 104.

The ignitor valve 106 may be radially secured by a valve guide 108 located circumferentially around the ignitor valve 106 and abutting the interior of the housing 102. A top end of the ignitor valve 106 may be in physical contact with an actuator 110 and one or more preload springs 112. When the ignitor valve 106 is in an open position, allowing gases to flow between an engine cylinder and an ignitor chamber 101 through inlet/outlet ports 104, the actuator 110 is closed, abutting an ignitor cap 114, and the preload springs 112 are not in compression. When the ignitor valve 106 is in a closed position, the actuator 110 is activated, pushing the ignitor valve 106 down, closing the inlet/outlet ports 104. This may cause the preload springs 112 to be in compression between the ignitor valve 106 end, or the actuator 110, and the valve guide 108.

The residual gas ignitor 100 may also be equipped with one or more heating elements 116 and/or insulation (not shown). The heating elements and/or insulation may be operable to keep residual gas in the ignitor chamber 101 hot, or may be operable to heat residual gas in the ignitor chamber 101, or both. In embodiments where the heating elements and/or insulation is operable to heat the residual gas in the ignitor chamber 101, the heating may be isochoric (i.e., the volume remains fixed, thereby increasing temperature and pressure of the gas contained within the ignitor, such as according to the ideal gas law).

Such a residual gas ignitor 100 may replace conventional spark plugs in typical gasoline engines, or may be installed alongside conventional spark plugs to increase efficiency of four-stroke engines. Additionally, the residual gas ignitor 100 may be used on other engine types, such as diesel engines, natural gas engines, or other such four-stroke engines.

Figure 2:
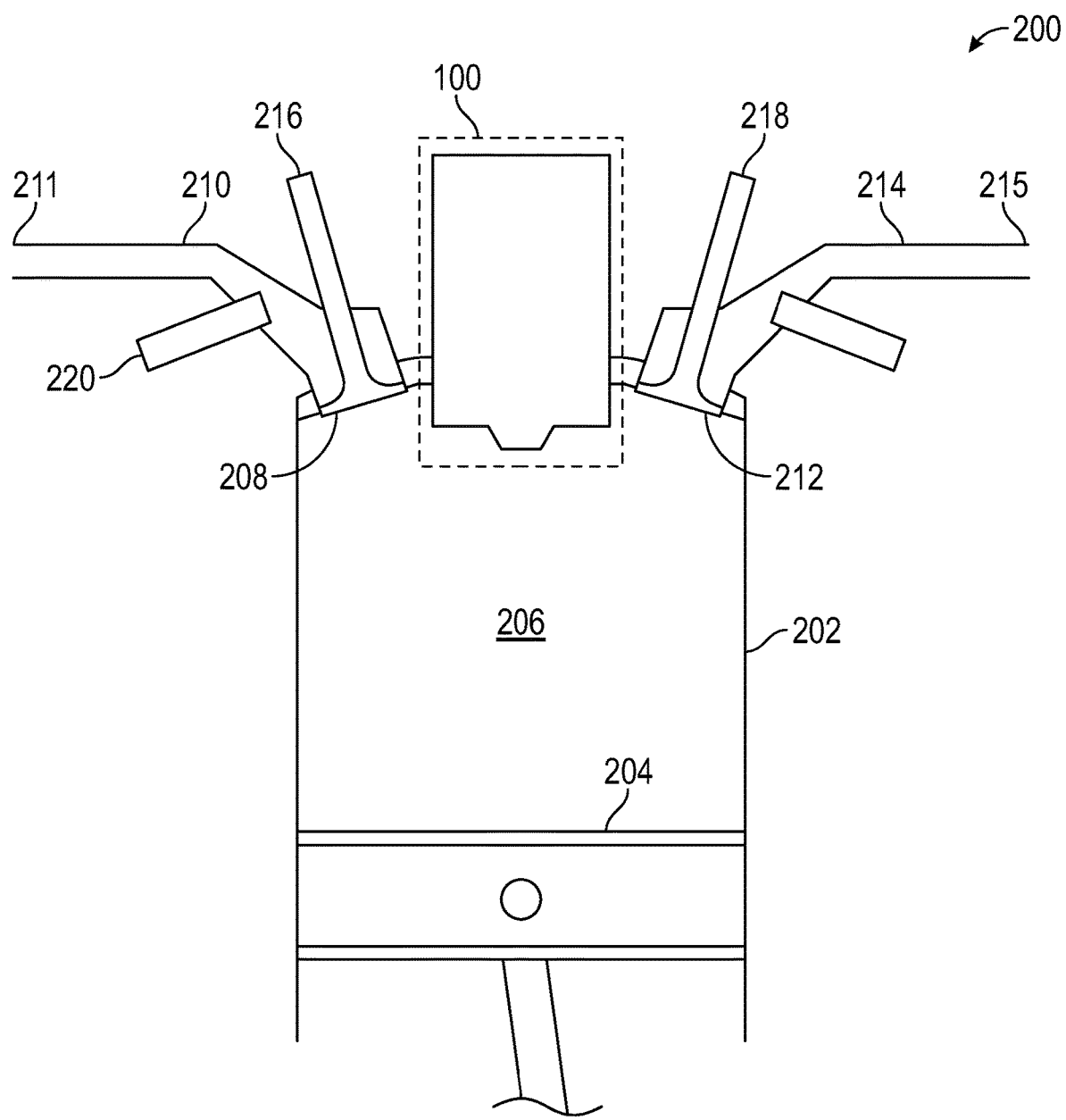
FIG. 2 illustrates an engine cylinder equipped with a residual gas ignitor according to one or more embodiments disclosed herein.

Turning now to FIG. 2, FIG. 2 shows a system including the residual gas ignitor 100 in an engine 200. Engine 200 includes an engine cylinder 202 formed within an engine body or engine block (not shown). For ease of illustration, engine 200 is shown with a single cylinder 202. However, engine 200 is not limited to a single cylinder and may have multiple cylinders, such as any number from 1-16 cylinders arranged inline, in a v-shape, or in a flat-plane. A piston 204 is arranged to move back and forth inside cylinder 202. Piston 204 is connected to a crankshaft (not shown), which converts the reciprocating motion of piston 204 into rotary motion, as is well known in the art of reciprocating internal combustion engines. Main combustion chamber 206 is defined within cylinder 202. The volume of the main combustion chamber 206 depends on the position of piston 204 within cylinder 202. The head of cylinder 202 includes an intake port 208 and an exhaust port 212. Intake port 208 is in fluid communication with an intake line 210. Intake line 210 has an inlet end 211 to receive air from the ambient environment. Intake line 210 may include a particulate filter (not shown) to remove particulate material from the received, ambient air. Exhaust port 212 is in fluid communication with an exhaust line 214. Exhaust line 214 has an outlet 215 to discharge exhaust gases to the ambient environment. Exhaust line 214 may include an exhaust emission control device (e.g., a catalytic converter, not shown) to reduce toxic gases and pollutants in the exhaust gases discharged to the ambient environment.

Intake line 210 terminates in an intake manifold (not shown). The flow of air from the intake manifold into inlet line 210 may be controlled by a throttle valve. An intake valve 216 is arranged at intake port 208 to control flow from inlet line 210 into main combustion chamber 206.

In normal operation, a fuel injector 220 may be positioned to inject fuel into the air flowing into intake port 208 from inlet line 210. The flowing air entrains the fuel, delivering a fuel-air mixture to main combustion chamber 206. Alternatively, a fuel injector may be positioned to inject fuel directly into main combustion chamber 206, where the injected fuel will mix with air received in main combustion chamber 206 through intake port 208. Alternatively, both port injection and direct injection of fuel into main combustion chamber 206 may be used.

Fuel may be injected by the fuel injector 220 into the combustion chamber 206 at high pressures to encourage atomization of the fuel in the air that is present in the combustion chamber. Atomization of the fuel may enhance combustion efficiency of the internal combustion engine and may decrease formation of particular matter emissions, as well as NOx and carbon monoxide, when the air-fuel mixture is combusted and reduce the amount of unreacted hydrocarbons exiting the engine during the exhaust stroke. In some embodiments, injection of the fuel at high pressures may allow for fuel to be injected a relatively far distance within the combustion chamber so that the air-fuel mixture can be well mixed at the time the air-fuel mixture is combusted. In some embodiments, the fuel may be injected at a pressure of at least about 100 bar, for example, at least about 120 bar, for example, at least about 140 bar, for example, at least about 160 bar, for example, at least about 180 bar, for example, at least about 200 bar. In some embodiments, the fuel may be injected at even higher pressures, for example, at least about 500 bar, for example, at least about 750 bar, for example, at least about 1000 bar. Injection of fuel at high pressures may improve atomization of the fuel in the combustion chamber. However, injection of fuel at high pressures may reduce the distance that the fuel travels within the combustion chamber. Accordingly, fuel may be injected at high pressures at timings corresponding to the piston being positioned in close proximity to the cylinder head, thereby reducing the distance the fuel must travel. Good atomization and mixing of the fuel in the combustion chamber may be exhibited as improved power delivery of the engine.

Cylinder 202 may operate on a four-stroke cycle including an intake stroke, a compression stroke, a power stroke, and an exhaust stroke. During the intake stroke, intake valve 216 is open, exhaust valve 218 is closed, and fuel and air are drawn into main combustion chamber 206. Ignitor valve 106 is also closed, preventing gas from entering or exiting ignitor chamber 101. During compression stroke, valves 216 and 218 are closed, and ignitor valve 106 is initially closed, while the fuel-air mixture in main combustion chamber 206 is compressed by piston 204. At the end of compression stroke, or during a late portion of the compression stroke, the ignitor valve 106 opens and, due to a higher pressure in the residual gas ignitor 100 than the main combustion chamber 206, discharges hot residual gas into the main combustion chamber 206. The high temperature gas causes the fuel-air mixture to ignite and burn in main combustion chamber 212, starting the power stroke, or combustion stroke. During the power stroke, the high-pressure gases produced from combustion of the fuel-air mixture in main combustion chamber 206 expand and push piston 204 down, generating force on the crank and shaft and useful work. During this stroke, valve 216 is closed, valve 218 is closed, and ignitor valve 106 is open thereby allowing combustion gases out of main combustion chamber 206 into the residual gas ignitor 100. The timing of opening and closing of valves 106, 216, 218 and operation of injector 220 and actuator 110, during the various strokes may be controlled by a computer (not shown).

At the end of the combustion stroke, ignitor valve 106 is closed by actuating actuator 110, and exhaust valve 218 is opened, thereby starting the exhaust stroke. At the end of the exhaust stroke exhaust valve 218 is closed, and inlet valve 216 is opened, thereby starting the next intake stroke. During the subsequent compression stroke, the residual gas stored in the residual gas ignitor is allowed to enter the main combustion chamber 206 as described above, thereby continuing the cycle.

Additionally, in one or more embodiments, residual gas from the residual gas ignitor may enter the main chamber during a compression stroke and/or an ignition stroke depending on engine operation. Addition of residual gas to the main chamber during the ignition stroke may increase fuel combustion efficiency during sub-optimal engine operations like high-load and cold-start situations. Further, in one or more embodiments, combustion gas may enter the residual gas ignitor following ignition, such as during the ignition stroke and/or the exhaust stroke. Addition of combustion gas to the residual gas ignitor during ignition and/or exhaust stroke may lead to improved cycle to cycle efficiency during sub-optimal engine operations like high-load and cold-start situations.

Additionally, in one or more embodiments, the residual gas ignitor may be controlled by a control system. The control system may be configured to actuate the ignitor valve into the open position during a compression stroke of the engine, thereby providing residual gas through the at least one inlet/outlet port to ignite a fuel/air mixture in the main combustion chamber and initiate a combustion stroke of the engine. The control system may also be configured to de-actuate the ignitor valve into the closed position during one of the ignition stroke and the exhaust stroke after the intake of the combustion gas into the residual gas ignitor through the at least one inlet/outlet port. In this manner, the residual gas ignitor may be charged and discharged during each complete cycle of the engine cylinder.

Figure 3:
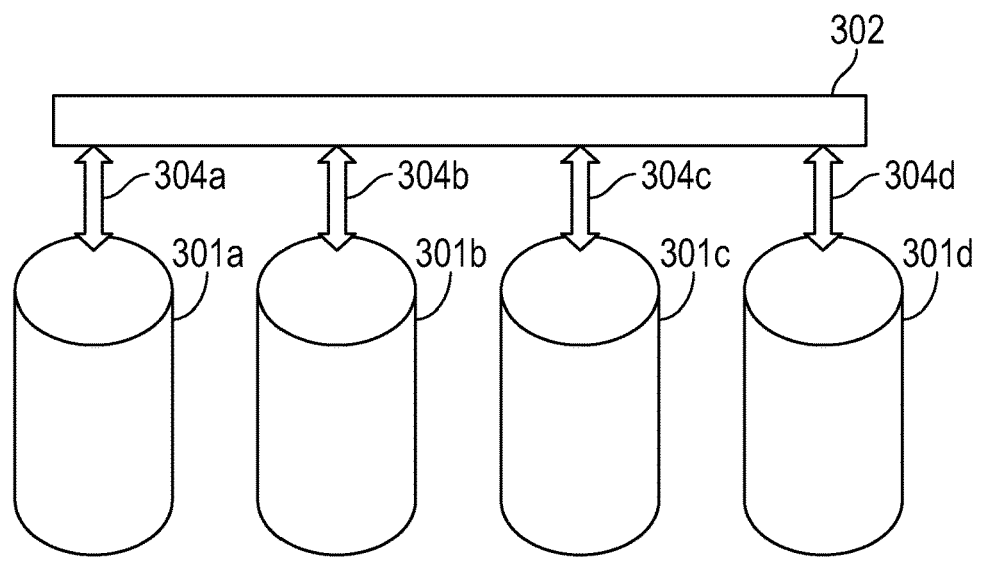
FIG. 3 illustrates a plurality of engine cylinders, each equipped with a residual gas ignitor according to one or more embodiments disclosed herein.
Figure 4:
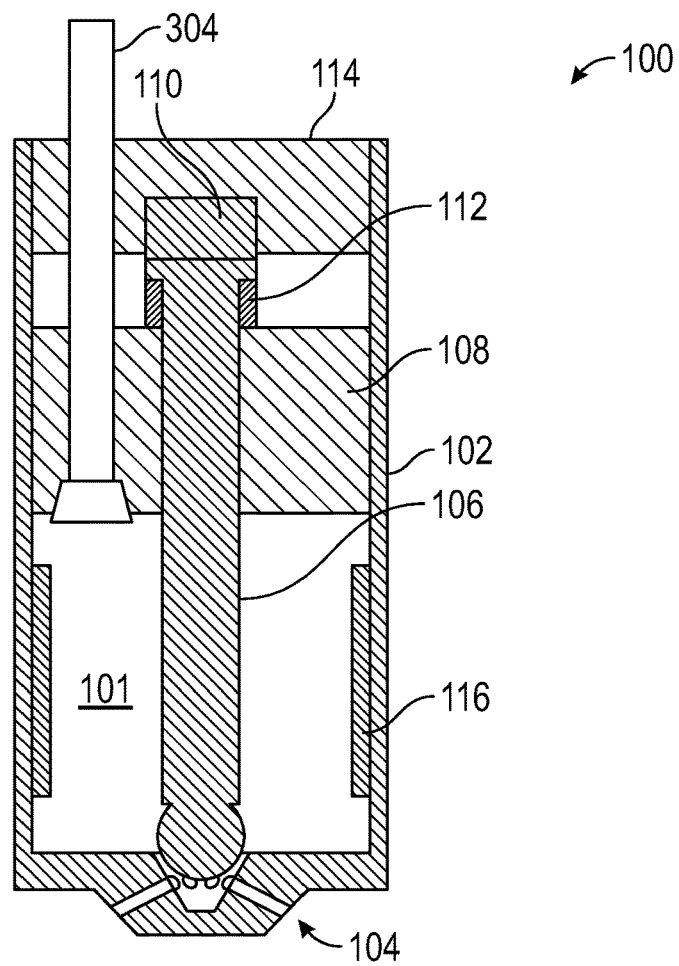
FIG. 4 illustrates a residual gas ignitor according to one or more embodiments disclosed herein.

Turning now to FIG. 3, FIG. 3 illustrates an embodiment where four cylinders, 301a, 301b, 301c, and 301d are used. Cylinders 301a, 301b, 301c, 301d may be connected to a common residual gas manifold 302 through gas valves 304a, 304b, 304c, 304d, respectively. Using such a system, the common residual gas manifold 302 may supply extra residual gas to cylinders 301a, 301b, 301c, 301d, or may receive extra residual gas from cylinders 301a, 301b, 301c, 301d in order to balance pressure. It may also be possible, in such embodiments, to feed hot residual gas from a cylinder in an expansion stroke directly to a corresponding cylinder in compression stroke. The residual gas ignitor 100 used in such embodiments is illustrated in FIG. 4, where like numbers represent like parts with respect to FIG. 1. As illustrated in FIG. 4, residual gas ignitor 100 is fitted with a gas valve 304 (gas valve 304a, 304b, 304c, 304d, FIG. 3) extended from outside the ignitor, through ignitor cap 114, valve guide 108, and into chamber 101. Accordingly, chambers 101 in corresponding residual gas ignitors on cylinders 301a, 301b, 301c, 301d may be fluid communication through common residual gas manifold 302.

As used herein, "ignition stroke" and "combustion stroke" may be used interchangeably.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. An internal combustion engine having a cylinder, comprising:
   a main combustion chamber; and
   a residual gas ignitor, the residual gas ignitor disposed at least partially within the main combustion chamber and in fluid communication with the main combustion chamber through at least one port, wherein the residual gas ignitor does not include a spark plug; the residual gas ignitor further comprising:
   a residual gas ignitor chamber configured for receiving combustion gas from the main combustion chamber;
   an ignitor valve configured for opening and closing the at least one port, the ignitor valve located within the residual gas ignitor chamber;
   a control system configured to actuate the ignitor valve into the open position during a compression stroke of the internal combustion engine, providing the combustion gas into the main combustion chamber through the at least one port;
   an actuator configured for actuating the ignitor valve to open and close the at least one port;
   a valve guide configured for keeping the ignitor valve in a correct orientation within the residual gas ignitor; and
   a preload spring configured for being in compression when the actuator is actuating the ignitor valve into the closed position, and when the actuator is not actuating the ignitor valve, the preload spring releases compression and opens the ignitor valve allowing for intake of the combustion gas into the residual gas ignitor chamber.

2. The system of claim 1, wherein the internal combustion engine further comprises:
   an engine intake line having an inlet end in communication with an ambient environment and an outlet end in communication with the internal combustion engine, the engine intake line to provide intake air to the internal combustion engine; and
   an engine exhaust line having an inlet end in communication with the internal combustion engine and an outlet end in communication with the ambient environment, the engine exhaust line to receive exhaust gases from the internal combustion engine.

3. The system of claim 2, further comprising:
   a heating element configured for maintaining or increasing a temperature of the combustion gas, while the combustion gas is in the residual gas ignitor chamber, at or to a temperature sufficient to ignite a fuel/air mixture in the main combustion chamber when the combustion gas is discharged from the ignitor chamber to the main combustion chamber.

4. The system of claim 2, further comprising:
   an insulating layer configured for maintaining the temperature of the combustion gas while the combustion gas is in the residual gas ignitor chamber.

5. The system of claim 1, wherein residual gas ignitor is configured to maintain a pressure in the residual gas ignitor from 5 bar to 250 bar, and a temperature from 400° C. to 2000° C.

6. The system of claim 1, wherein the residual gas ignitor has a gas chamber volume of 0.5% of an engine displacement to 10% of the internal combustion engine displacement, where the internal combustion engine displacement is a volume of a plurality of main combustion chambers.

7. The system of claim 1, wherein the residual gas ignitor further comprises between two and twelve ports located around a periphery of a bottom end of the residual gas ignitor.

8. The system of claim 1, further comprising steps of:
   generating the combustion gas in the main combustion chamber initiating a first ignition stroke;
   flowing a first portion of the combustion gas into the residual gas ignitor;
   actuating an actuator in the residual gas ignitor, thereby closing an ignitor valve in the residual gas ignitor;
   flowing a second portion of the combustion gas into an exhaust gas flow line, as an exhaust gas;
   closing an exhaust valve in the exhaust gas flow line;
   opening an intake valve in an intake flow line, thereby filling the main combustion chamber with a fuel-air mixture;
   closing the intake valve;
   compressing the fuel-air mixture main combustion chamber;
   igniting the fuel-air mixture in the main combustion chamber and initiating a second ignition stroke, the igniting and initiating comprising de-actuating the actuator in the residual gas ignitor, thereby opening the ignitor valve allowing the first portion of the combustion gas to enter the main combustion chamber, the first portion of the combustion gas igniting the fuel-air mixture in the main combustion chamber and initiating the second ignition stroke.

9. The system of claim 8, further comprising repeating the steps of generating through igniting in each subsequent engine cycle.

10. The system of claim 8, further comprising heating the stream of combustion gas in the residual gas ignitor via a heating element.

11. The system of claim 8, further comprising compressing a preload spring in the residual gas ignitor during the actuating step.

12. The system of claim 11, further comprising de-compressing the preload spring in the residual gas ignitor during the de-actuating step.

13. The system of claim 8, where in a volume of an interior chamber of the residual gas ignitor remains constant, and the flowing of the first portion of the stream of combustion gas into and out of the residual gas ignitor is performed by a pressure differential between the residual gas ignitor and the main combustion chamber.

* * * * *